(12) United States Patent
Lee

(10) Patent No.: US 8,824,278 B2
(45) Date of Patent: Sep. 2, 2014

(54) METHOD AND APPARATUS FOR AVOIDING INTERFERENCE IN LOCAL AREA WIRELESS COMMUNICATION SYSTEM

(75) Inventor: Chung Hee Lee, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 150 days.

(21) Appl. No.: 13/418,194

(22) Filed: Mar. 12, 2012

(65) Prior Publication Data

US 2013/0077552 A1    Mar. 28, 2013

(30) Foreign Application Priority Data

Sep. 27, 2011 (KR) .................. 10-2011-0097811

(51) Int. Cl.
| | |
|---|---|
| *H04J 1/16* | (2006.01) |
| *H04L 12/26* | (2006.01) |
| *H04W 72/04* | (2009.01) |
| *H04L 12/28* | (2006.01) |
| *H04W 84/18* | (2009.01) |

(52) U.S. Cl.
CPC ............ *H04W 72/042* (2013.01); *H04W 84/18* (2013.01)
USPC .......................................... 370/225; 370/408

(58) Field of Classification Search
None
See application file for complete search history.

(56) References Cited

U.S. PATENT DOCUMENTS

| | | | | |
|---|---|---|---|---|
| 2009/0129323 | A1* | 5/2009 | Chen et al. ..................... | 370/329 |
| 2010/0173586 | A1* | 7/2010 | McHenry et al. ............... | 455/62 |
| 2012/0282861 | A1* | 11/2012 | Linde et al. .................. | 455/63.1 |

FOREIGN PATENT DOCUMENTS

| | | |
|---|---|---|
| JP | 2008-193247 A | 8/2008 |
| KR | 10-2008-0104134 A | 12/2008 |
| KR | 10-2009-0103666 A | 10/2009 |
| KR | 10-2010-0004830 A | 1/2010 |
| KR | 10-2011-0050220 A | 5/2011 |

* cited by examiner

*Primary Examiner* — Ayaz Sheikh
*Assistant Examiner* — Sori Aga
(74) *Attorney, Agent, or Firm* — Bracewell & Giuliani LLP; Brad Y. Chin

(57) ABSTRACT

Provided is a method and apparatus for avoiding an interference in a local area wireless communication system. The method includes (a) transmitting, by an interference device detecting a frequency interference, a channel update request signal to a channel manager, (b) broadcasting, by the channel manager, channel update information including new channel information in response to the channel update request and changing a channel, (c) rebroadcasting, by at least one device having received the broadcasted channel update information, the received channel update information and changing a channel after waiting for a maximum polling delay time of a child sleep device, and (d) transmitting, by the at least one device having changed the channel, a channel change confirmation packet to the channel manager.

20 Claims, 6 Drawing Sheets

METHOD AND APPARATUS FOR AVOIDING INTERFERENCE IN LOCAL AREA WIRELESS COMMUNICATION SYSTEM

CROSS-REFERENCE TO RELATED APPLICATIONS

This application claims the benefit of Korean Patent Application No. 10-2011-0097811 filed with the Korea Intellectual Property Office on Sep. 27, 2011, the disclosure of which is incorporated herein by reference.

BACKGROUND OF THE INVENTION

1. Field of the Invention

The present invention relates to a method and apparatus for avoiding an interference in a local area wireless communication system, and more particularly, to a method and apparatus for avoiding a frequency interference in a local area wireless communication network when each device detects the frequency interference.

2. Description of the Related Art

Nowadays, due to the development and convenience of wireless communication technologies such as ZigBee, various wireless communication technologies are used in more electronic devices. Unlike wired communication, an increases in the frequency of use of wireless communication may cause a radio interference between wireless communication devices. Most wireless communication technologies nearly avoid a mutual interference by dividing use frequencies. However, in the case of an ISM frequency band around 2.4 GHz, the use of which is rapidly increasing in recent years, the problem of a radio interference becomes more serious because many wireless technologies use the same frequency. Thus, it is very important to develop technologies for solving the problem of the radio interference between wireless technologies using the ISM frequency band.

The problem of the radio interference between wireless technologies is treated in two directions of detecting an interference and avoiding an interference. According to subjects, interference avoiding methods may be classified into a method for detecting and avoiding an interference by a controller or a master device or each router in a wireless communication system, and a method for detecting and avoiding an interference by each device itself. In most technologies for solving a radio interference in wireless communication, a controller or a master device or each router detects and avoids an interference in a wireless communication system.

However, there is little technology that solves the problem of a radio interference in a wireless communication system by each member device itself not by a controller or a master device or each router. Korean Patent Application Laid-open No. 2010-0048642 filed by the present applicant discloses a method for detecting an interference by each member device itself.

However, there is no effective technology developed to avoid an interference when each member device itself detects a frequency interference.

SUMMARY OF THE INVENTION

The present invention has been invented in order to overcome the above-described problems and it is, therefore, an object of the present invention to provide a method and apparatus for avoiding a frequency interference in a local area wireless communication network when each member device detects the frequency interference.

In accordance with one aspect of the present invention to achieve the object, there is provided a method for avoiding an interference in a local area wireless communication system, which includes: (a) transmitting, by an interference device detecting a frequency interference, a channel update request signal to a channel manager; (b) broadcasting, by the channel manager, channel update information including new channel information in response to the channel update request and changing a channel; (c) rebroadcasting, by at least one device having received the broadcasted channel update information, the received channel update information and changing a channel after waiting for a maximum polling delay time of a child sleep device; and (d) transmitting, by the at least one device having changed the channel, a channel change confirmation packet to the channel manager.

The method may further include detecting, by each device, a frequency interference occurring in an own current channel thereof before step (a).

Step (b) may include: (b-1) transmitting, by the channel manager having received the channel update request signal, a first reception response signal in response to the channel update request signal; (b-2) broadcasting, by the channel manager, the channel update information including new channel information after transmitting the first reception response signal; and (b-3) changing, by the channel manager, a channel after the lapse of a broadcast delay time.

The method may further include determining, by the interference device having transmitted the channel update request signal to the channel manager, whether the first reception response signal is received from the channel manager, and retransmitting the channel update request signal if the first reception response signal is not received from the channel manager.

In step (c), at least one device, having received the channel update information, among the interference device and at least one normal device not detecting an interference may rebroadcast the received channel update information.

Step (c) may include: (c-1) receiving the broadcasted channel update information by at least one device among the interference device and at least one normal device not detecting an interference; (c-2) rebroadcasting the received channel update information by at least one device having received the broadcasted channel update information; (c-3) changing, by the at least one device having rebroadcasted the received channel update information, the channel after waiting for the maximum polling delay time of the child sleep device; and (c-4) receiving, by each child sleep device, the channel update information by polling during the polling delay time and changing the channel.

In step (c-1), the at least one device having received the broadcasted channel update information may transmit a second reception response signal to the channel manager, and the channel manager may rebroadcast the channel update information if failing to receive the second reception response signal within a predetermined time after broadcasting the channel update information.

The method may further include: (e) transmitting, by the channel manager, a third reception response signal in response to the channel change confirmation packet signal and confirming, by the at least one device, the reception of the third reception response signal; and (f) scanning, by the at least one device failing to receiving the third reception response signal and/or at least one device in a poor communication state caused by the non-reception of the first reception response signal or the non-reception of the broadcasted channel update information, the main channels among a plurality of channels of the wireless communication system, finding a channel including at least one device having the same extended network ID as an own extended network ID thereof, and changing to the found channel.

Step (f) may include: (f-1) sequentially scanning the main channels among a plurality of available channels of the wireless communication system; (f-2) determining whether there is the channel(s) including at least one device having the same extended network ID and whether the channel(s) is singular or plural; and (f-3) changing to the relevant channel if the channel is singular, and changing to the channel including at least one device having the newest update ID if the channels are plural.

The frequency interference may be caused by the collision between a ZigBee signal and other wireless communication signal, and the local area wireless communication may be ZigBee communication.

In accordance with another aspect of the present invention to achieve the object, there is provided a method for avoiding an interference in a local area wireless communication system, which includes: (1) detecting, by each device, a frequency interference occurring in an own current channel thereof; (2) transmitting, by an interference device having detected a frequency interference in step (1), a channel update request signal to a channel manager; (3) receiving channel update information, including new channel information, broadcasted from the channel manager in response to the channel update request signal of step (2), rebroadcasting the received channel update information, and changing a channel after waiting for a maximum polling delay time of a child sleep device; (4) transmitting, by the device having changed the channel in step (3), a channel change confirmation packet to the channel manager; and (5) determining whether the reception response signal in response to the channel change confirmation packet signal is received from the channel manager, scanning the main channels among a plurality of channels of the wireless communication system if failing to receive the reception response signal, finding a channel including other device having the same extended network ID as an own extended network ID thereof, and changing to the found channel.

The method may further include determining whether the reception response signal in response to the channel update request signal is received from the channel manager after transmission of the channel update request signal in step (2), and retransmitting the channel update request signal if the reception response signal in response to the channel update request signal is not received from the channel manager.

Step (5) may include: (5a) determining whether the reception response signal in response to the channel change confirmation packet signal is received from the channel manager; (5b) sequentially scanning the main channels among a plurality of available channels of the wireless communication system if failing to receive the reception response signal in response to the channel change confirmation packet signal in step (5a); (5c) determining whether there is the channel(s) including other device having the same extended network ID and whether the channel(s) is singular or plural; and (5d) changing to the relevant channel if the channel is singular in step (5c), and changing to the channel including other device having the newest update ID if the channels are plural.

In step (3), the channel update information may be transmitted to the child sleep device(s) if an inquiry signal by the polling is received from the child sleep device(s) during the maximum polling delay time.

The frequency interference may be caused by the collision between a ZigBee signal and other wireless communication signal, and the local area wireless communication may be ZigBee communication.

In accordance with another aspect of the present invention to achieve the object, there is provided an apparatus for avoiding an interference in a local area wireless communication system, which includes: an interference detecting unit for detecting a frequency interference occurring in an own current channel thereof; a radio frequency (RF) communication unit for communicating with a channel manager and at least one other device or child sleep device, changing a communication channel under the control of an interference avoidance controlling unit, communicating signals through the changed channel in the case of a channel change, and scanning the main channels among a plurality of channels of the wireless communication system under the control of the interference avoidance controlling unit in the case of poor communication in the current channel; a time counting unit for counting time and transmitting information about the lapse of a maximum polling delay time of the child sleep device(s) to the interference avoidance controlling unit under the control of the interference avoidance controlling unit; and an interference avoidance controlling unit for generating and controlling to transmit a channel update request signal if the interference detecting unit detects the frequency interference, controlling to rebroadcast a channel update information if the channel update information, including new channel information, broadcasted by the channel manager is received from the channel manager according to the channel update request signal, controlling to change into a new channel included in the channel update information after the lapse of the maximum polling delay time received from the time counting unit after the rebroadcast, controlling to transmit a channel change confirmation packet to the channel manager after the channel change, determining whether a reception response signal in response to the channel change confirmation packet signal is received from the channel manager, controlling the RF communication unit to scan the main channels if the reception response signal is not received, finding from the scanning result a channel including other device having the same extended network ID as an own extended network ID thereof, and controlling to change into the found channel.

The interference avoidance controlling unit may control to transmit the reception response signal if the channel update information is received from the channel manager, and to retransmit the channel update request signal if the reception response signal in response to the channel update request signal is not received from the channel manager.

The interference avoidance controlling unit may determine from the scanning result whether there is the channel(s) including other device having the same extended network ID and whether the channel(s) is singular or plural, control the RF communication unit to scan the main channels if the channel is not present, to change into the relevant channel if the channel is singular, and to change into a channel including other device having the newest update ID if the channel is plural.

The interference avoidance controlling unit may control to transmit the channel update information to the child sleep device(s) if an inquiry signal by the polling is received from the child sleep device(s) during the maximum polling delay time.

The frequency interference may be caused by the collision between a ZigBee signal and other wireless communication signal, and the local area wireless communication may be ZigBee communication.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
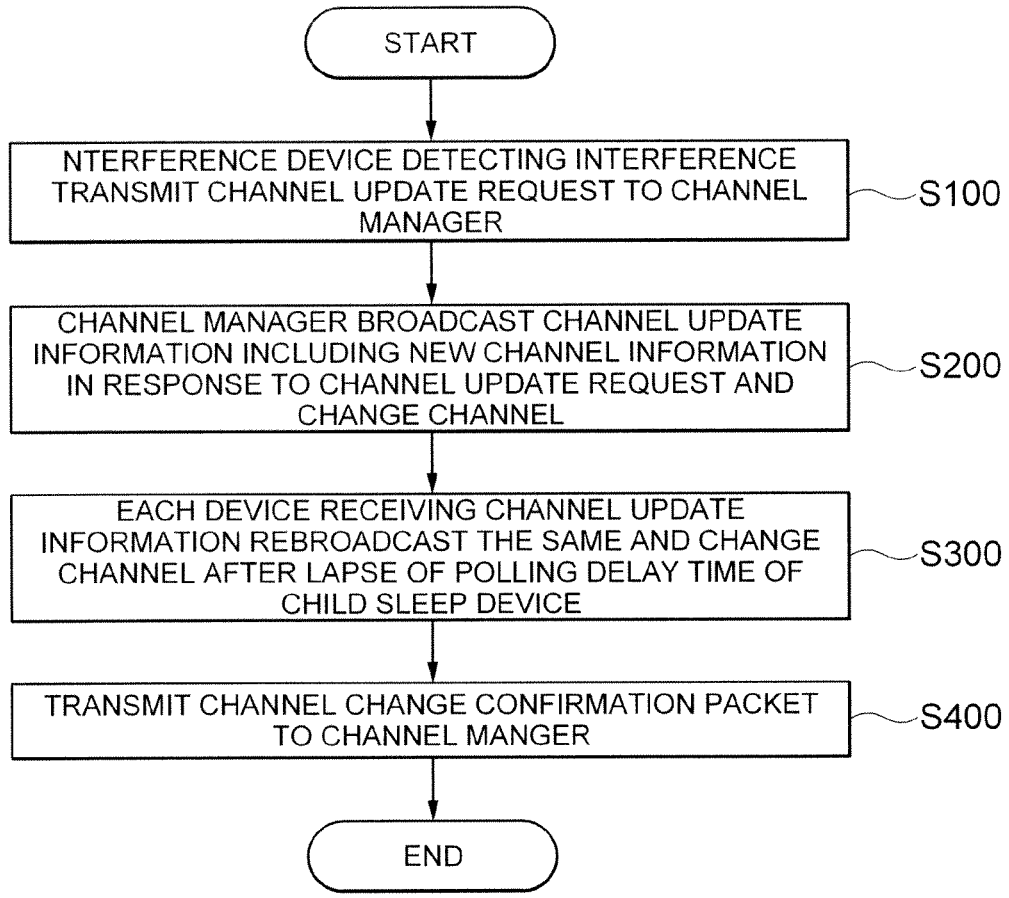
FIG. 1 is a flow diagram illustrating a method for avoiding an interference in a local area wireless communication system in accordance with an embodiment of the present invention.

Hereinafter, specific embodiments of a method and apparatus for avoiding an interference in a local area wireless communication system in accordance with the present invention will be described with reference to FIGS. 1 to 6. However, the present invention is provided for the illustrative purpose only but not limited thereto.

The objects, features, and advantages of the present invention will be apparent from the following detailed description of embodiments of the invention with references to the following drawings. Descriptions of well-known components and processing techniques are omitted so as not to unnecessarily obscure the embodiments of the present invention. The following terms are defined in consideration of functions of the present invention and may be changed according to users' or operators' intentions or customs. Thus, the terms shall be defined based on the contents described throughout the specification.

This invention may be embodied in different forms and should not be construed as limited to the embodiments set forth herein. Rather, these embodiments are provided so that this disclosure will be thorough and complete, and will fully convey the scope of the invention to those skilled in the art.

Embodiments of the present invention for achieving the above objects will be described with reference to the accompanying drawings. In the specification, like reference numerals denote like elements, and duplicate or redundant descriptions will be omitted for conciseness.

It will be understood that when an element is referred to as being 'connected to' or 'coupled to' another element, it may be directly connected or coupled to the other element or at least one intervening element may be present therebetween. In contrast, when an element is referred to as being 'directly connected to' or 'directly coupled to' another element, there are no intervening element therebetween.

It should be noted that the singular forms 'a' 'an' and 'the' are intended to include the plural forms as well, unless the context clearly indicates otherwise.

It should be understood that the terms 'comprise', 'include' and 'have', when used in this specification, specify the presence of stated features or elements, but do not preclude the presence or addition of one or more other features, elements, or combinations thereof.

First, a method for avoiding an interference in a local area wireless communication system in accordance with first embodiments of the present invention will be described below in detail with reference to FIGS. 1 to 4.

Figure 2:
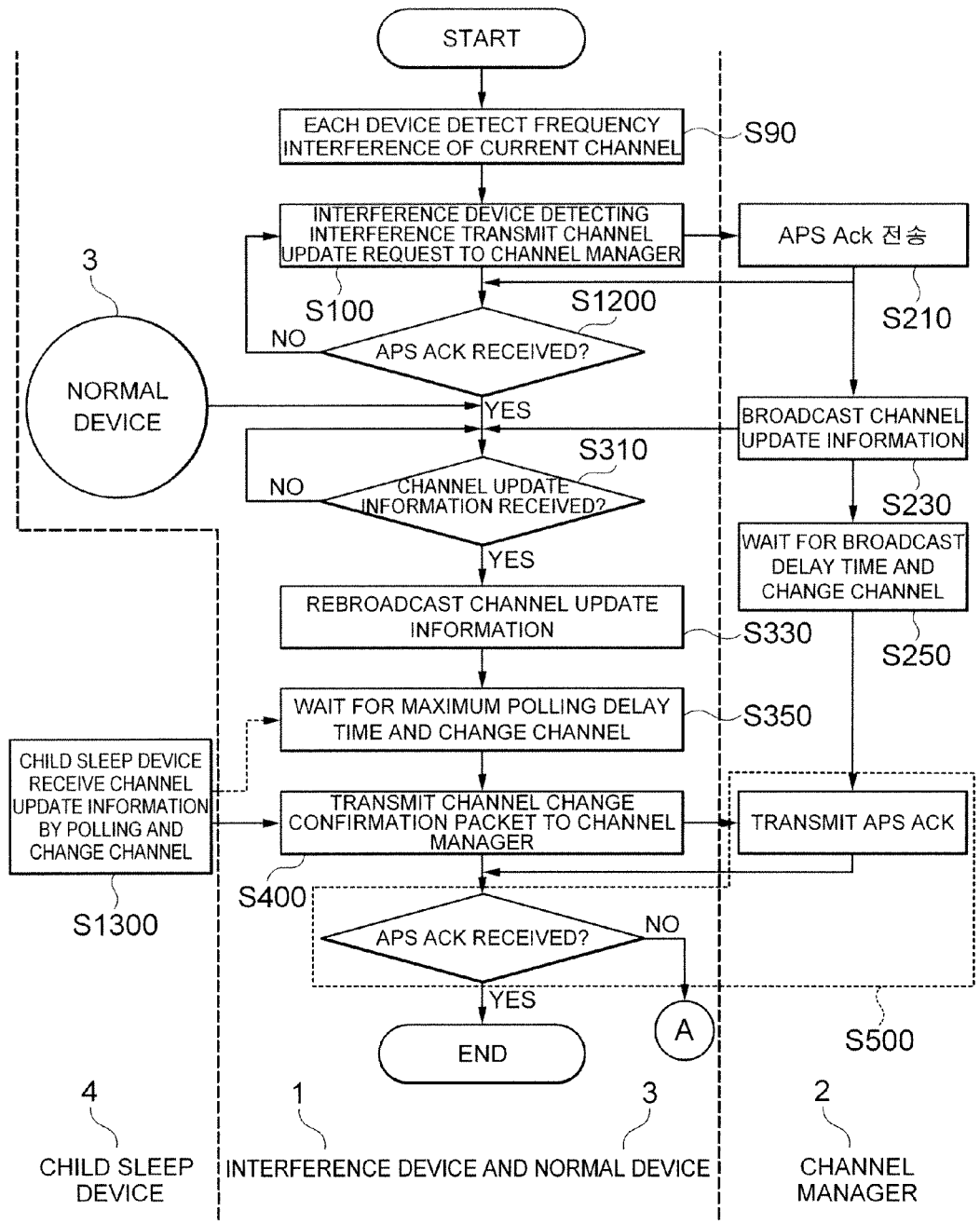
FIG. 2 is a flow diagram illustrating a method for avoiding an interference in a local area wireless communication system in accordance with another embodiment of the present invention.
Figure 3:
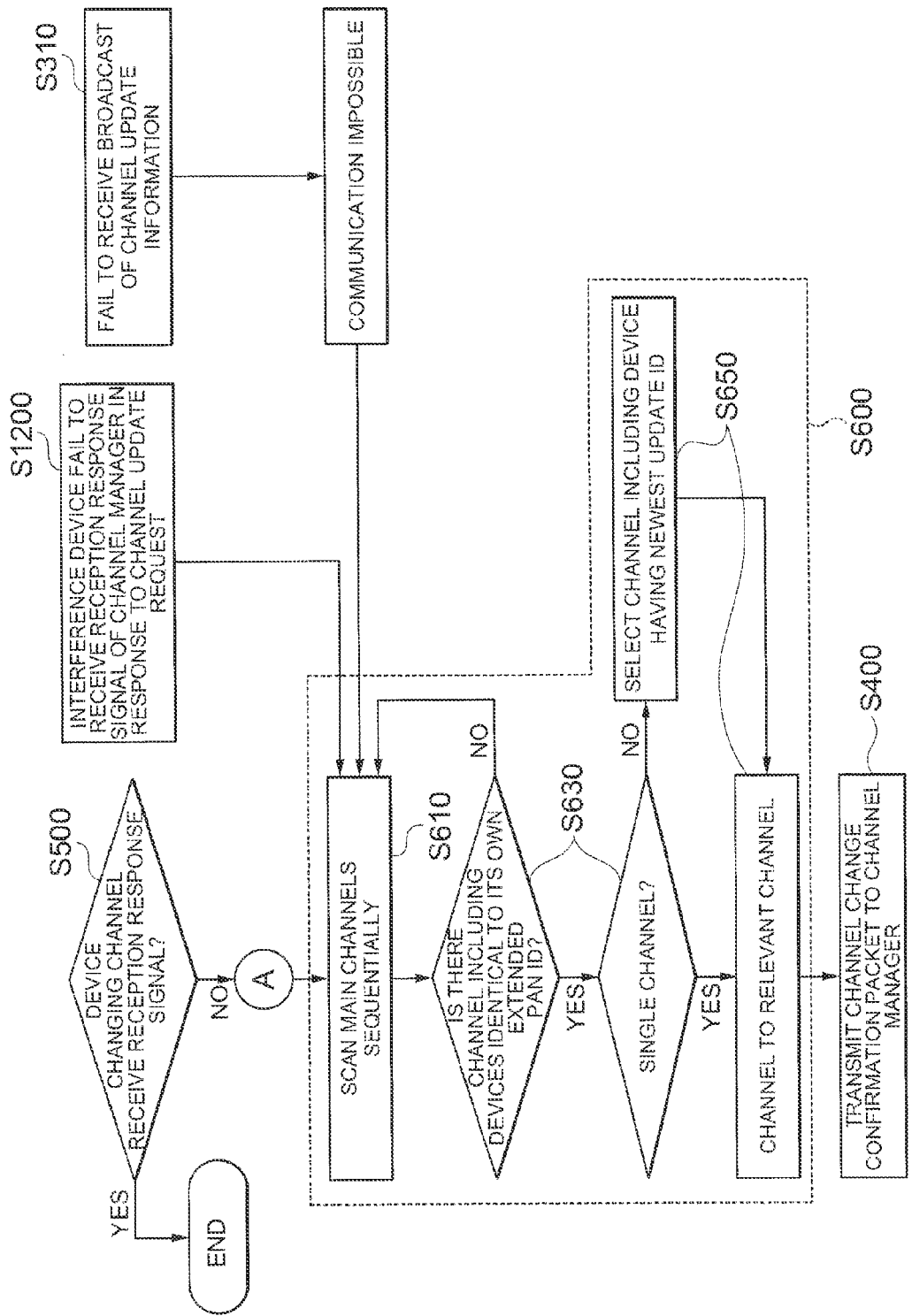
FIG. 3 is a flow diagram illustrating a portion of a method for avoiding an interference in a local area wireless communication system in accordance with another embodiment of the present invention.
Figure 4:
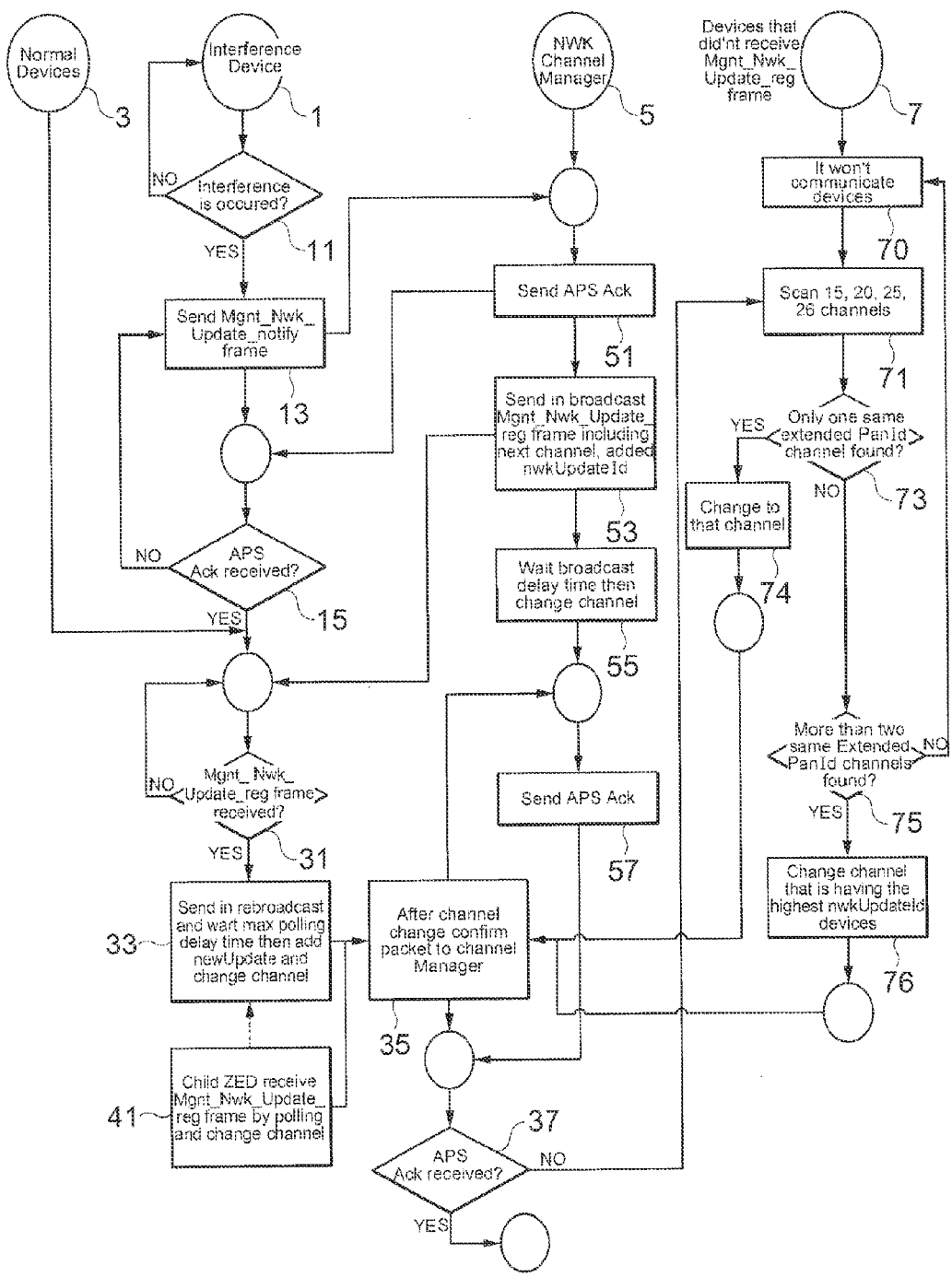
FIG. 4 is an algorithm illustrating a method for avoiding an interference in a local area wireless communication system in accordance with an embodiment of the present invention.

FIG. 1 is a flow diagram illustrating a method for avoiding an interference in a local area wireless communication system in accordance with an embodiment of the present invention. FIG. 2 is a flow diagram illustrating a method for avoiding an interference in a local area wireless communication system in accordance with another embodiment of the present invention. FIG. 3 is a flow diagram illustrating a portion of a method for avoiding an interference in a local area wireless communication system in accordance with another embodiment of the present invention. FIG. 4 is an algorithm illustrating a method for avoiding an interference in a local area wireless communication system in accordance with an embodiment of the present invention.

Referring to FIGS. 1 to 4, a method for avoiding an interference in a local area wireless communication system in accordance with first embodiments of the present invention includes the following steps (a) to (d) (see S100 to S400 of FIG. 1). Examples of the local area wireless communication include ZigBee communication, wireless LAN (WLAN) communication, and Bluetooth communication.

In accordance with an exemplary embodiment of the present invention, a frequency interference may be caused by the collision between a ZigBee signal and other wireless communication signal. In an exemplary embodiment, the local area wireless communication may be ZigBee communication. This embodiment may be used in any field using ZigBee, to provide effective interference avoidance.

First, referring to FIGS. 1, 2 and/or 4, when detecting a frequency interference (S90), an interference device 1 transmits a channel update request signal to a channel manager 2 in step (a) (see S100 of FIGS. 1 and 2, and reference numeral 13 of FIG. 4). First, when a frequency interference occurs in a specific device (reference numeral 11 of FIG. 4), the interference device 1 detecting the frequency interference (S90) transmits a channel change request to the channel manager 2. The interference device 1 transmits a channel update request signal to the channel manager 2 (S100 and reference numeral 13 of FIG. 4). Referring to FIG. 4, the channel update request signal is Mgnt_Nwk_Update_Notify frame.

Referring to FIG. 2, in an exemplary embodiment, step (S90) of each device detecting a frequency interference occurring in its own current channel may be further included before step (a) (S100) of FIG. 1. The present invention relates to a technology for avoiding an interference when each device itself detects a frequency interference. A method for detecting a frequency interference by each device itself in this embodiment may use a known technology. For example, a method disclosed in Korean Patent Application No. 2008-0107900 filed by the present applicant may be used. However, the present invention is not limited thereto, and other known technologies of detecting a frequency interference by a device itself may be used. When the frequency interference detecting method disclosed in Korean Patent Application No. 2008-

0107900 is used, the contents of Korean Patent Application Laid-open No. 2010-0048642 may be incorporated in the present invention.

Next, step (b) (see S200 of FIG. 1, S210 to S250 of FIG. 2, and reference numerals 51 to 55 of FIG. 4) will be described with reference to FIGS. 1, 2 and/or 4. Referring to FIG. 1, in step (b) (S200), in response to the channel update request, the channel manager 2 broadcasts channel update information included in new channel information and changes a channel. The broadcasted channel updated information may include a new channel value and an updated channel update ID. For example, referring to FIG. 4, the broadcasted channel updated information is Mgnt_Nwk_Update_req frame, and the Mgnt_Nwk_Update_req frame may include the next channel value as the new channel value, together with the channel update ID 'nwkUpdateId' (see reference numeral 53). The new channel value may be used to change a channel, and the channel update ID may be used to find the newest update ID in an exemplary embodiment (see reference numeral 76 of FIG. 4).

Also, referring to FIGS. 2 and/or 4, in accordance with another exemplary embodiment, step (b) (S200) of FIG. 1 may include the following steps (b-1) to (b-3) (S210 to S250 of FIG. 2, and reference numerals 51, 53 and 55 of FIG. 4).

In step (b-1) (S210 of FIG. 2 and reference numeral 51 of FIG. 4), the channel manager 2 transmits a first reception response signal in response to the channel update request signal received. In FIG. 4, the first reception response signal is APS_Ack frame in the reference numeral 51.

In accordance with another exemplary embodiment, the interference device 1 may determine whether the first reception response signal is received from the channel manager 2 and may retransmit the channel update request signal if the first reception response signal is not received from the channel manager 2 (S1200 of FIG. 2 and reference numeral 15 of FIG. 4).

Referring to FIGS. 2 and/or 4, in step (b-2) (S230 of FIG. 2 and reference numeral 53 of FIG. 4), the channel manager 2 broadcasts channel update information including new channel information.

In step (b-3) (S250 of FIG. 2 and reference numeral 55 of FIG. 4), the channel manager 2 changes a channel after the lapse of a broadcast delay time. In an exemplary embodiment, the broadcast delay time may be a sufficient time taken to transmit a second reception response signal for the channel update information reception to the channel manager 2 by at least one device having received the broadcast.

Next, step (c) (S300) will be described with reference to FIGS. 1, 2 and/or 4. Referring to FIGS. 1, 2 and/or 4, in step (c) (see S300 of FIG. 1, S310 and S330 of FIG. 2, and reference numeral 31 of FIG. 4), at least one device having received the broadcasted channel update information rebroadcasts the received channel update information. Each device having received the broadcasted channel update information determines whether it was retransmitted by itself. If it is a new broadcast, it is rebroadcasted. If the retransmitted broadcast is received, it is discarded. Also, in step (c) (see S300 of FIG. 1, S310 and S330 of FIG. 2, and reference numeral 31 of FIG. 4), at least one device having rebroadcasted changes a channel after waiting for the maximum polling delay time of a child sleep device(s) 4. In the present invention, the child sleep device(s) 4 is a child device subordinate to each parent device in the wireless communication system, which means a device performing a polling operation. The maximum polling time is the maximum polling period among the child devices subordinate to each device.

Also, referring to FIGS. 2 and/or 4, in accordance with an exemplary embodiment of the present invention, in step (c) (S300), at least one device receiving the channel update information among the interference device 1 and at least one normal device 3 not detecting the interference may rebroadcast the received channel update information, In the present invention, the normal device 3 is a device not detecting the interference in the wireless communication system. Since the channel manager 2 rebroadcasts the channel update information in step (b) (S200), not only the interference device 1 but also the normal device 3 may receive the broadcasted channel update information.

Referring to FIGS. 2 and/or 4, in another exemplary embodiment, step (c) (S300) may include the following steps (c-1) to (c-3) (see S310, S330 and S350 of FIG. 2 and reference numerals 31 and 33 of FIG. 4). Also, in accordance with another exemplary embodiment, step (c-4) (S1300 of FIG. 2 and reference numeral 41 of FIG. 4) may be added.

In step (c-1) (see S310 of FIG. 2 and reference numeral 31 of FIG. 4), at least one device among the interference device 1 and at least one normal device 3 not detecting an interference receives the broadcasted channel update information.

Although not illustrated in the drawings, in accordance with another exemplary embodiment, in step (c-1) (see S310 of FIG. 2 and reference numeral 31 of FIG. 4), at least one device receiving the broadcasted channel update information may transmit the second reception response signal to the channel manager 2. Also, although not illustrated in the drawings, the channel manager 2 may rebroadcast the channel update information if failing to receive the second reception response signal within a predetermined time after broadcasting the channel update information. The channel manager 2 may change a channel if receiving the second reception response signal within the predetermined time.

In step (c-2) (see S330 of FIG. 2 and reference numeral 33 of FIG. 4), at least one device receiving the broadcasted channel update information rebroadcasts the received channel update information.

In step (c-3) (see S350 of FIG. 2 and reference numeral 33 of FIG. 4), at least one device having rebroadcasted changes the channel after waiting for the maximum polling delay time of the child sleep device(s) 4.

Also, in step (c-4) (see S1300 of FIG. 2 and reference numeral 41 of FIG. 4), the child sleep device(s) 4 receives the channel update information by polling during the polling delay time and changes a channel.

Step (d) (see S400 of FIGS. 1 and 2 and reference numeral 35 of FIG. 4) will be described with reference to FIGS. 1, 2 and/or 4. In step (d) of FIG. 1 (see S400 of FIGS. 1 and 2 and reference numeral 35 of FIG. 4), at least one device changing a channel transmits a channel change confirmation packet to the channel manager 2. Also, in accordance with an exemplary embodiment, as illustrated in FIGS. 2 and 4, if the child sleep device(s) 4 changes a channel, it may also transmit a channel change confirmation packet to the channel manager 2. Also, in an exemplary embodiment, as illustrated in FIGS. 3 and 4, if a device in a poor communication state caused by an unchanged communication channel determines a channel by main channels scanning and changes a channel, it may also transmit a channel change confirmation packet to the channel manager 2.

Additional exemplary embodiments of the present invention will be described with reference to FIGS. 2, 3 and 4.

Referring to FIGS. 2, 3 and/or 4, an exemplary embodiment of the interference avoiding method of the local area wireless communication system may further include the following steps (e) and (f) (S500 and S600).

First, referring to FIGS. 2 and/or 4, in step (e) (see S500 of FIG. 2 and reference numerals 57 and 37 of FIG. 4), the channel manager receives a third reception response signal with respect to the channel change confirmation packet signal (57 of FIG. 4), and at least one device confirms the reception of the third reception response signal (37 of FIG. 4). Referring to FIG. 4, the third reception response signal is APS_Ack frame.

Referring to FIGS. 3 and/or 4, in step (f) (see S600 of FIG. 2 and reference numerals 71 to 76 of FIG. 4), at least one device failing to receiving the third reception response signal, or at least one device in a poor communication state (reference numeral 70 of FIG. 4) caused by the non-reception of the first reception response signal or the non-reception of the broadcasted channel update information, or both of them (reference numeral 7 of FIG. 4) scans the main channels among a plurality of channels of the wireless communication system (S610 of FIG. 3 and reference numeral 51 of FIG. 4). The device scanning the main channels finds a channel including at least one device having the same extended network (or PAN) ID as its own extended network ID, and changes to the found channel (S630 and S650 of FIG. 3 and reference numerals 73 and 76 of FIG. 4). A description of this step is the same as a description of S5200 of FIG. 5. FIG. 4 illustrates an example of a ZigBee system. ZigBee may use 16 channels (channels 11~26) at intervals of 5 MHz in an ISN 2.4 GHz band. Referring to reference numeral 51 of FIG. 4, channels 15, 20, 25 and 26 are scanned among the channels 11~26 available in the ISN 2.4 GHz band. The channels 15, 20, 25 and 26 are the main channels of ZigBee communication.

Referring to FIGS. 3 and/or 4, in another exemplary embodiment, step (f) (S600 of FIG. 3 and reference numerals 71 to 76 of FIG. 4) may include the following steps (f-1) to (f-3) (see S610 to S650 of FIG. 3 and reference numerals 71 to 76 of FIG. 4).

In step (f-1) (S610 of FIG. 3 and reference numeral 71 of FIG. 4), the main channels among the available channels of the wireless communication system are scanned sequentially.

In step (f-2) (S630 of FIG. 3 and reference numerals 73 and 75 of FIG. 4), it determines whether there is a channel including at least one device having the same extended network ID, and whether the channel is singular or plural.

In step (f-3) (S650 of FIG. 3 and reference numerals 74 and 76 of FIG. 4), if the channel is singular (reference numeral 73 of FIG. 4), it changes to the relevant channel (reference numeral 74 of FIG. 4); and if the channel is plural (reference numeral 75 of FIG. 4), it changes to a channel including at least one device having the newest update ID (reference numeral 76 of FIG. 4).

An interference avoiding method of a local area wireless communication system in accordance with second embodiments of the present invention will be descried below in detail with reference to the drawings. These embodiments will be described with reference to not only FIG. 5 but also the above-described embodiments and FIGS. 1 to 4, and redundant descriptions will be omitted for conciseness.

Figure 5:
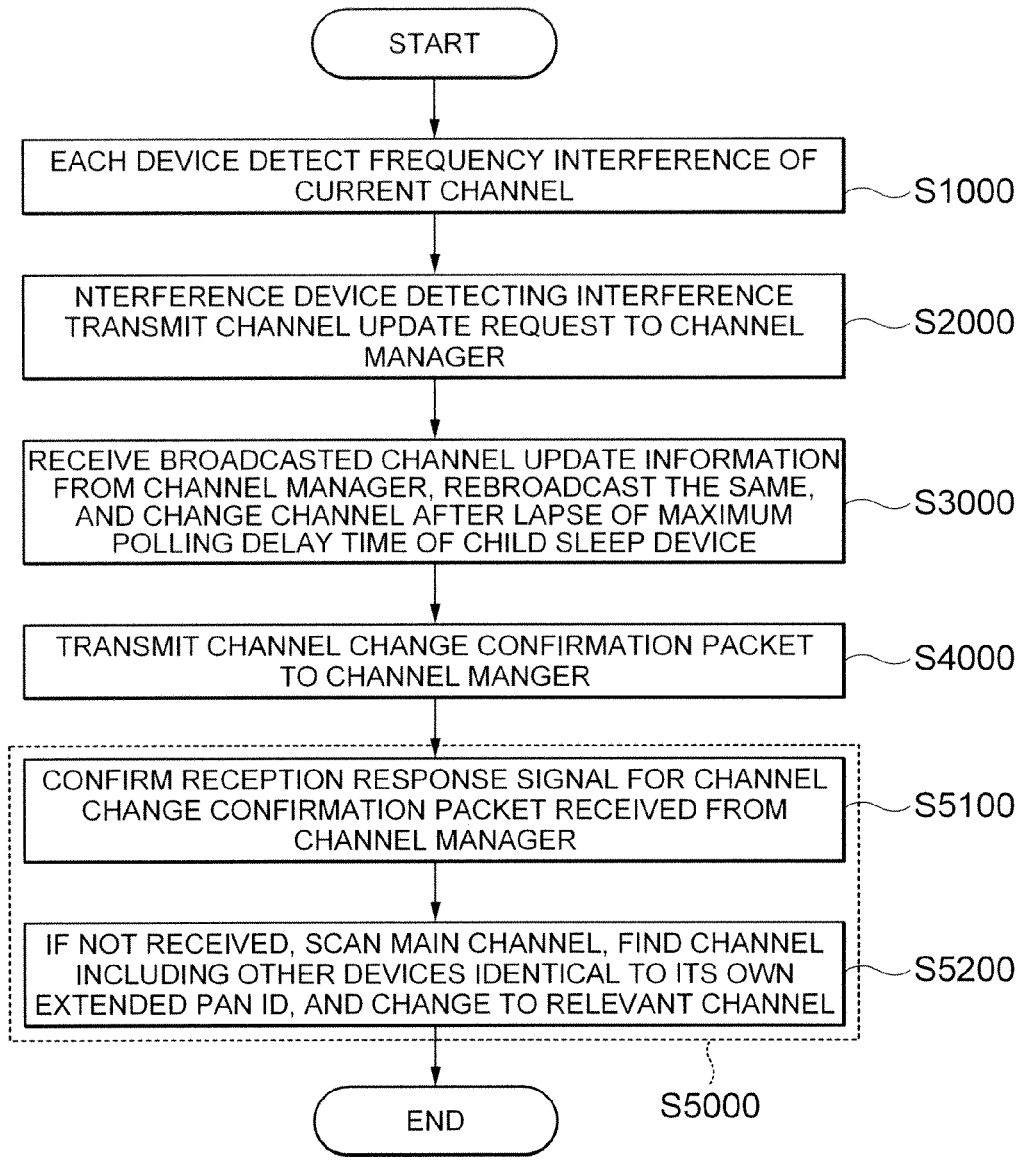
FIG. 5 is a flow diagram illustrating a method for avoiding an interference in a local area wireless communication system in accordance with another embodiment of the present invention.

FIG. 5 is a flow diagram illustrating a method for avoiding an interference in a local area wireless communication system in accordance with another embodiment of the present invention.

Referring to FIG. 5, an interference avoiding method of a local area wireless communication system in accordance with a second embodiment of the present invention includes the following steps (1) to (5) (S1000 to S5000).

Also, in accordance with an exemplary embodiment, a frequency interference may be caused by the collision between a ZigBee signal and other wireless communication signal. In accordance with an exemplary embodiment, the local area wireless communication may be ZigBee communication.

First, referring to FIG. 5, in step (1) (S1000), each device detects a frequency interference occurring in its own current channel. Since step (1) (S1000) is the same as S30 of FIG. 2, a detailed description thereof will be made with reference to the above-described embodiment.

In step (2) (S2000), an interference device 1 detecting a frequency interference in step (1) (S1000) transmits a channel update request signal to a channel manager 2. Since step (2) (S2000) is the same as S100 of FIGS. 1 and 2 and reference numeral 13 of FIG. 4, a detailed description thereof will be made with reference to the above-described embodiment.

Another exemplary embodiment of the present invention will be described below with reference to S1200 of FIG. 2 and reference numeral 15 of FIG. 4. After step (2) (S2000) of FIG. 5, the method may further include a step of determining whether it receives a reception response signal in response to the channel update request signal from the channel manager 2 after transmitting the channel update request signal in step (2) (S2000), and retransmitting the channel update request signal to the channel manager 2 if it does not receive a reception response signal in response to the channel update request signal from the channel manager 2.

Next, step (3) (S3000) will be described with reference to FIG. 5. In step (3) (S3000), it receives channel update information including new channel information broadcasted from the channel manager 2. Also, in step (3) (S3000), it rebroadcasts the received channel update information, and changes a channel after waiting for the maximum polling delay time of a child sleep device(s) 4. In the case of a rebroadcast, each device receiving the broadcasted channel update information checks whether it is a broadcast retransmitted by itself, and retransmits the same if it is a new broadcast.

Also, in an exemplary embodiment, in step (3) (S3000) of FIG. 5, if receiving an inquiry signal by the polling from the child sleep device(s) 4 within the maximum polling delay time, it may transmit channel update information to the child sleep device(s) 4.

Next, step (4) (S4000) will be described with reference to FIG. 5. In step (4) (S4000), the device having changed a channel in step (3) (S3000) transmits a channel change confirmation packet to the channel manager 2.

Next, step (5) (S5000) will be described with reference to FIG. 5. In step (5) (S5000), it determines whether it receives a reception response signal in response to the channel change confirmation packet signal from the channel manager. If failing to receive the reception response signal, it scans the main channels among a plurality of channels of the wireless communication system, finds a channel including other device having the same extended network (or PAN) ID as its own extended network ID, and changes to the found channel.

Also, referring to FIGS. 5 and 3 and/or 4, in an exemplary embodiment, step (5) (S500) of FIG. 5 may include the following steps (5a) to (5d).

First, in step (5a) (S5100 of FIG. 5, S500 of FIG. 3, and reference numeral 37 of FIG. 4), it checks whether a reception response signal in response to the channel change confirmation packet signal is received from the channel manager.

In step (5b) (S610 of FIG. 3 and reference numeral 71 of FIG. 4), if failing to receive the reception response signal in response to the channel change confirmation packet signal in step (5a) (S5100, S500, and reference numeral 37), it sequentially scans the main channels among a plurality of channels of the wireless communication system. FIG. 4 illustrates an example of a ZigBee system. Referring to reference numeral 51 of FIG. 4, it scans channels 15, 20, 25 and 26 among the channels 11~26 available in the ISN 2.4 GHz band. The channels 15, 20, 25 and 26 are the main channels of ZigBee communication.

In step (5c) (S620 of FIG. 3 and reference numerals 73 and 75 of FIG. 4), it determines whether there is a channel including at least one other device having the same extended network ID, and whether the channel is singular or plural.

In step (5d) (see S630 of FIG. 3 and reference numerals 74 and 76 of FIG. 4), if the channel is singular in step (5c) (S620) (reference numeral 73 of FIG. 4), it changes to the relevant channel (reference numeral 74 of FIG. 4); and if the channel is plural (reference numeral 75 of FIG. 4), it changes to a channel including other device having the newest update ID (reference numeral 76 of FIG. 4).

Next, an apparatus for avoiding an interference in a local area wireless communication system in accordance with third embodiments of the present invention will be described with reference to the drawings. These embodiments will be described with reference to not only FIG. 6 but also the above-described embodiments of the interference avoiding methods and FIGS. 1 to 5, and redundant descriptions will be omitted for conciseness.

Figure 6:
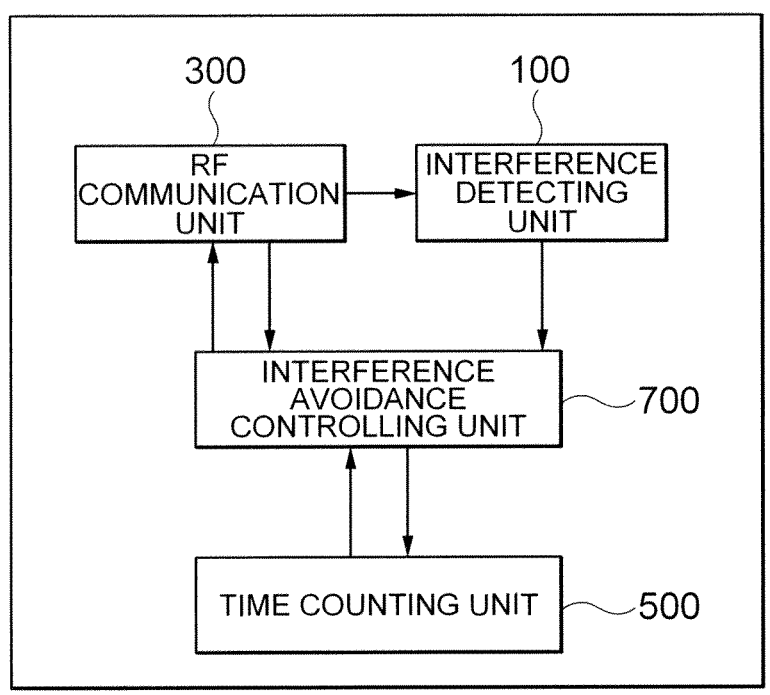
FIG. 6 is a block diagram illustrating an apparatus for avoiding an interference in a local area wireless communication system in accordance with another embodiment of the present invention.

FIG. 6 is a block diagram illustrating an apparatus for avoiding an interference in a local area wireless communication system in accordance with another embodiment of the present invention.

Referring to FIG. 6 and FIGS. 1 to 5, an apparatus for avoiding an interference in a local area wireless communication system in accordance with a third embodiment of the present invention includes an interference detecting unit 100, a radio frequency (RF) communication unit 300, a time counting unit 500, and an interference avoidance controlling unit 700. In accordance with an exemplary embodiment, a frequency interference may be caused by the collision between a ZigBee signal and other wireless communication signal. In accordance with an exemplary embodiment, the local area wireless communication may be ZigBee communication.

The interference detecting unit 100 detects a frequency interference occurring in its own current channel (see S900 of FIG. 2 and S1000 of FIG. 5).

The RF communication unit 300 communicates with a channel manager 2 and at least one other device or child sleep device(s) 4. Under the control of the interference avoidance controlling unit 700, the RF communication unit 300 changes a communication channel and maintains the changed communication channel. If the communication channel is changed, the RF communication unit 300 communicates signals with the channel manager 2 or other devices through the changed channel. Referring to S610 of FIG. 3, reference numeral 71 of FIG. 4, and S5000 of FIG. 5, the RF communication unit 300 scans the main channels among a plurality of the wireless communication system under the control of the interference avoidance controlling unit 700 in the case of poor communication in the current channel.

The time counting unit 500 counts time, and transmits information about the lapse of the maximum polling delay time of the child sleep device(s) 4 to the interference avoidance controlling unit 700 under the control of the interference avoidance controlling unit 700.

If the interference detecting unit 100 detects a frequency interference (see S90 of FIG. 2 and S1000 of FIG. 5), the interference avoidance controlling unit 700 generates a channel update request signal and controls the RF communication unit 300 to transmit the channel update request signal to the channel manager 2 (see S100 of FIGS. 1 and 2, reference numeral 13 of FIG. 4, and S2000 of FIG. 5).

Referring to FIGS. 2 and 4, in another exemplary embodiment, the interference avoidance controlling unit 700 may determine whether a reception response signal in response to the channel update request signal is received from the channel manager 2 (see S1200 of FIG. 2 and reference numeral 15 of FIG. 4). If the reception response signal in response to the channel update request signal is received, the interference avoidance controlling unit 700 may control the RF communication unit 300 to retransmit the channel update request signal to the channel manager 2.

Referring to FIG. 6, if channel update information including new channel information broadcasted is received from the channel manager 2 according to the channel update request signal, the interference avoidance controlling unit 700 controls the RF communication unit 300 to rebroadcast the channel update information (see S300 of FIG. 1, S310 and S330 of FIG. 2, reference numerals 31 and 33 of FIG. 4, and S3000 of FIG. 5). If receiving the broadcasted channel update information, the interference avoidance controlling unit 700 checks whether it is a broadcast retransmitted by its own device, and retransmits the same if it is a new broadcast.

Although not illustrated in the drawings, in another exemplary embodiment, the interference avoidance controlling unit 700 determines whether channel update information is received from the channel manager 2. If the channel update information is received, the interference avoidance controlling unit 700 may control the RF communication unit 300 to transmit a reception response signal to the channel manager 2.

After the rebroadcast, the interference avoidance controlling unit 700 controls the RF communication unit to change to a new channel included in the channel update information after the lapse of the maximum polling delay time received from the time counting unit 500 (see S300 of FIG. 1, S350 of FIG. 2, S33 of FIG. 4, and S3000 of FIG. 5).

Referring to S1300 of FIG. 2 and reference numeral 41 of FIG. 4, in an exemplary embodiment, the interference avoidance controlling unit 700 may control the RF communication unit 300 to transmit channel update information to the child sleep device(s) 4 if receiving an inquiry signal by the polling from the child sleep device(s) 4 within the maximum polling delay time.

Referring to FIG. 6, the interference avoidance controlling unit 700 controls to change the channel, generates a channel change confirmation packet, and controls the RF communication unit 300 to transmit the channel change confirmation packet to the channel manager 2 (see S400 of FIGS. 1 and 2, S35 of FIG. 4, and S4000 of FIG. 5).

Also, the interference avoidance controlling unit 700 determines whether a reception response signal in response to the channel change confirmation packet signal is received from the channel manager 2 (see S500 of FIGS. 2 and 3, reference numeral 37 of FIG. 3, and S5100 of FIG. 5). Referring to S610 of FIG. 3, reference numeral 71 of FIG. 3, and S5200 of FIG. 5, if the reception response signal is not received, the interference avoidance controlling unit 700 controls the RF communication unit 300 to scan the main channel.

The interference avoidance controlling unit 700 finds, from the scanning result, a channel including other device having the same extended network (or PAN) ID as its own extended network ID, and controls the RF communication unit 300 to change to the found channel (see S620 and S630 of FIG. 3, reference numerals 73 and 76 of FIG. 3, and S5200 of FIG. 5).

Referring to FIGS. 3 and 4, in another exemplary embodiment, the interference avoidance controlling unit 700 determines, from the scanning result, whether there is a channel including other device having the same extended network ID, and whether the channel is singular or plural (see S630 of FIG. 3 and reference numerals 73 and 75 of FIG. 4). If there is no channel, the interference avoidance controlling unit 700 may control the RF communication unit 300 to scan the main channel. If the channel is singular (see reference numeral 73 of FIG. 4), the interference avoidance controlling unit 700 may change to the relevant channel (see reference numeral 74 of FIG. 4). On the other hand, if the channel is plural (see reference numeral 75 of FIG. 4), the interference avoidance controlling unit 700 may change to a channel including other device having the newest update ID (see reference numeral 76 of FIG. 4).

As can be seen from the foregoing, in accordance with an exemplary embodiment of the present invention, when each member device itself detects the frequency interference in the local area wireless communication network, the frequency interference can be effectively avoided.

In accordance with an exemplary embodiment of the present invention, when the interference occurs in any field using ZigBee, the interference can be effectively avoided by the interference detection in each member ZigBee device.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A method for avoiding an interference in a local area wireless communication system, which comprises:
   (a) transmitting, by an interference node device detecting a frequency interference, a channel update request signal to a channel manager;
   (b) broadcasting, by the channel manager, channel update information including new channel information in response to the channel update request and changing a channel;
   (c) rebroadcasting, by at least one node device having received the broadcasted channel update information, the received channel update information and changing a channel after waiting for a maximum polling delay time of a child sleep device(s) forming a parent-child relationship with the at least one node device; and
   (d) transmitting, by the at least one node device having changed the channel, a channel change confirmation packet to the channel manager.

2. The method according to claim 1, which further comprises detecting, by each node device, the frequency interference occurring in an own current channel thereof before step (a).

3. The method according to claim 1, wherein step (b) comprises:
   (b-1) transmitting, by the channel manager having received the channel update request signal, a first reception response signal in response to the channel update request signal;
   (b-2) broadcasting, by the channel manager, the channel update information including new channel information after transmitting the first reception response signal; and
   (b-3) changing, by the channel manager, a channel after the lapse of a broadcast delay time.

4. The method according to claim 3, which further comprises determining, by the interference node device having transmitted the channel update request signal to the channel manager, whether the first reception response signal is received from the channel manager, and retransmitting the channel update request signal if the first reception response signal is not received from the channel manager.

5. The method according to claim 1, wherein, in step (c), at least one node device, having received the channel update information, among the interference node device and at least one normal node device not detecting an interference rebroadcasts the received channel update information.

6. The method according to claim 5, wherein step (c) comprises:
   (c-1) receiving the broadcasted channel update information by the at least one node device among the interference node device and the at least one normal node device not detecting the interference;
   (c-2) rebroadcasting the received channel update information by the at least one node device having received the broadcasted channel update information;
   (c-3) changing, by the at least one node device having rebroadcasted the received channel update information, the channel after waiting for the maximum polling delay time of the child sleep device(s); and
   (c-4) receiving, by each child sleep device(s), the channel update information by polling during the polling delay time and changing the channel.

7. The method according to claim 6, wherein, in step (c-1), the at least one node device having received the broadcasted channel update information transmits a second reception response signal to the channel manager, and
   the channel manager rebroadcasts the channel update information if failing to receive the second reception response signal within a predetermined time after broadcasting the channel update information.

8. The method according to claim 1, which further comprises:
   (e) transmitting, by the channel manager, a third reception response signal in response to the channel change confirmation packet signal and confirming, by the at least one node device, the reception of the third reception response signal; and
   (f) scanning, by the at least one node device failing to receive the third reception response signal and/or at least one node device in a poor communication state caused by the non-reception of the first reception response signal or the non-reception of the broadcasted channel update information, the main channels among a plurality of channels of the wireless communication system, finding a channel including at least one node device having the same extended network ID as an own extended network ID thereof, and changing to the found channel.

9. The method according to claim 8, wherein step (f) comprises,
   (f-1) sequentially scanning the main channels among a plurality of available channels of the wireless communication system;
   (f-2) determining whether there is the channel(s) including at least one node device having the same extended network ID and whether the channel(s) is singular or plural; and
   (f-3) changing to the relevant channel if the channel is singular, and changing to the channel including at least one node device having the newest update ID if the channels are plural.

10. The method according to claim 1, wherein the frequency interference is caused by the collision between a ZigBee signal and other wireless communication signal, and the local area wireless communication is ZigBee communication.

11. A method for avoiding an interference in a local area wireless communication system, which comprises:
- (1) detecting, by a node device pertaining to the system, a frequency interference occurring in an own current channel thereof;
- (2) transmitting, by an interference node device having detected a frequency interference in step (1), a channel update request signal to a channel manager;
- (3) receiving channel update information, including new channel information, broadcasted from the channel manager in response to the channel update request signal of step (2), rebroadcasting the received channel update information, and changing a channel after waiting for a maximum polling delay time of a child sleep device(s) forming a parent-child relationship with the interference node device;
- (4) transmitting, by the node device having changed the channel in step (3), a channel change confirmation packet to the channel manager; and
- (5) determining whether the reception response signal in response to the channel change confirmation packet signal is received from the channel manager or a communication state is poor according to the non-reception of the channel update information, scanning the main channels among a plurality of channels of the wireless communication system if failing to receive the reception response signal or being the poor communication state according to the non-reception of the channel update information, finding a channel including other node device having the same extended network ID as an own extended network ID thereof, and changing to the found channel.

12. The method according to claim 11, which further comprises determining whether the reception response signal in response to the channel update request signal is received from the channel manager after transmission of the channel update request signal in step (2), and retransmitting the channel update request signal if the reception response signal in response to the channel update request signal is not received from the channel manager.

13. The method according to claim 11, wherein step (5) comprises:
- (5a) determining whether the reception response signal in response to the channel change confirmation packet signal is received from the channel manager or a communication state is poor according to the non-reception of the channel update information;
- (5b) sequentially scanning the main channels among a plurality of available channels of the wireless communication system if failing to receive the reception response signal in response to the channel change confirmation packet signal or being the poor communication state according to the non-reception of the channel update information in step (5a);
- (5c) determining whether there is the channel(s) including other node device having the same extended network ID and whether the channel(s) is singular or plural; and
- (5d) changing to the relevant channel if the channel is singular in step (5c), and changing to the channel including other node device having the newest update ID if the channels are plural.

14. The method according to claim 11, wherein in step (3), the channel update information is transmitted to the child sleep device(s) if an inquiry signal by the polling is received from the child sleep device(s) during the maximum polling delay time.

15. The method according to claim 11, wherein the frequency interference is caused by the collision between a ZigBee signal and other wireless communication signal, and the local area wireless communication is ZigBee communication.

16. An apparatus for avoiding an interference in a local area wireless communication system, which comprises:
- an interference detecting unit for detecting a frequency interference occurring in an own current channel thereof;
- a radio frequency (RF) communication unit for communicating with a channel manager and at least one other node device and a child sleep device(s) forming a parent-child relationship with itself, changing a communication channel under the control of an interference avoidance controlling unit, communicating signals through the changed channel in the case of a channel change, and scanning the main channels among a plurality of channels of the wireless communication system under the control of the interference avoidance controlling unit in the case of poor communication in the current channel;
- a time counting unit for counting time and transmitting information about the lapse of a maximum polling delay time of the child sleep device(s) to the interference avoidance controlling unit under the control of the interference avoidance controlling unit; and
- the interference avoidance controlling unit for generating and controlling to transmit a channel update request signal if the interference detecting unit detects the frequency interference, controlling to rebroadcast a channel update information if the channel update information, including new channel information, broadcasted by the channel manager is received from the channel manager according to the channel update request signal, controlling to change into a new channel included in the channel update information after the lapse of the maximum polling delay time received from the time counting unit after the rebroadcast, controlling to transmit a channel change confirmation packet to the channel manager after the channel change, determining whether a reception response signal in response to the channel change confirmation packet signal is received from the channel manager or an own communication state is poor according the non-reception of the channel update information, controlling the RF communication unit to scan the main channels if the reception response signal is not received or the own communication state is poor, finding from the scanning result a channel including other node device having the same extended network ID as an own extended network ID thereof, and controlling to change into the found channel.

17. The apparatus according to claim 16, wherein the interference avoidance controlling unit controls to transmit the reception response signal if the channel update information is received from the channel manager, and to retransmit the channel update request signal if the reception response signal in response to the channel update request signal is not received from the channel manager.

18. The apparatus according to claim 16, Wherein the interference avoidance controlling unit determines from the scanning result whether there is the channel(s) including other node device having the same extended network ID and whether the channel(s) is singular or plural, controls the RF communication unit to scan the main channels if the channel(s) is not present, to change into the relevant channel if the channel is singular, and to change into the channel including other node device having the newest update ID if the channels are plural.

19. The apparatus according to claim 16, wherein the interference avoidance controlling unit controls to transmit the channel update information to the child sleep device(s) if an inquiry signal by the polling is received from the child sleep device(s) during the maximum polling delay time.

20. The apparatus according to claim 16, wherein the frequency interference is caused by the collision between a ZigBee signal and other wireless communication signal, and the local area wireless communication is ZigBee communication.

* * * * *